US008911859B1

(12) United States Patent
Spatcher

(10) Patent No.: US 8,911,859 B1
(45) Date of Patent: Dec. 16, 2014

(54) CARBON NANOTUBE MATERIAL AND METHOD OF MAKING THE SAME

(75) Inventor: James M. Spatcher, North Kingstown, RI (US)

(73) Assignee: Lockheed Martin Corporation, Bethesda, MD (US)

( * ) Notice: Subject to any disclaimer, the term of this patent is extended or adjusted under 35 U.S.C. 154(b) by 201 days.

(21) Appl. No.: 13/288,895

(22) Filed: Nov. 3, 2011

Related U.S. Application Data

(60) Provisional application No. 61/410,503, filed on Nov. 5, 2010.

(51) Int. Cl.
*B32B 3/26* (2006.01)

(52) U.S. Cl.
USPC ............. 428/315.7; 428/315.5; 977/742; 977/745; 977/750; 977/752

(58) Field of Classification Search
USPC ........... 428/315.5, 315.7; 977/742, 752, 745, 977/750
See application file for complete search history.

(56) References Cited

U.S. PATENT DOCUMENTS

| 8,324,487 | B2 * | 12/2012 | Shen et al. ................ 252/71 |
|---|---|---|---|
| 2003/0086858 | A1 * | 5/2003 | Niu et al. ................... 423/447.1 |
| 2006/0134326 | A1 * | 6/2006 | Watanabe et al. ........... 427/180 |
| 2010/0092371 | A1 * | 4/2010 | Backov et al. .............. 423/460 |
| 2010/0216026 | A1 * | 8/2010 | Lopatin et al. ............. 429/246 |
| 2011/0111279 | A1 * | 5/2011 | Smithyman et al. ......... 429/122 |
| 2012/0211367 | A1 * | 8/2012 | Vecitis ........................ 204/554 |

FOREIGN PATENT DOCUMENTS

FR 2910458 A1 * 6/2008

OTHER PUBLICATIONS

Sears et al., "Recent Developments in Carbon Naotube Membranes for Water Purification and Gas Separation," Materials 2010, vol. 3, p. 127-149.*
D. Fairen-Jimenez, et al., "Porosity and Surface Area of Monolithic Carbon Aerogels Prepared Using Alkaline Carbonates and Organic Acids as Polymerization Catalysts," Science Direct, Carbon 44 (2006) pp. 2301-2307.
Mateusz B. Bryning, et al., "Carbon Nanotube Aerogels," Advanced Materials, 2007, vol. 19, pp. 661-664.

* cited by examiner

*Primary Examiner* — Hai Vo
(74) *Attorney, Agent, or Firm* — McDermott, Will & Emery LLP

(57) ABSTRACT

A nanoporous network includes carbon nanotubes (CNTs) with the network having a pore size in a range from about 15 nm to about 35 nm. The nanoporous network can be coated, compressed, or any combination of these operations in the manufacture of various articles. A method of making a nanoporous network includes disposing a concentrated aqueous CNT solution in a mold, freezing the concentrated aqueous CNT solution, and subliming the frozen concentrated CNT solution in a vacuum chamber.

6 Claims, 9 Drawing Sheets

CARBON NANOTUBE MATERIAL AND METHOD OF MAKING THE SAME

The present application claims priority benefit under 35 U.S.C. §119(e) from U.S. Provisional Application No. 61/410,503 filed Nov. 5, 2010, which is incorporated herein by reference in its entirety.

BACKGROUND OF THE INVENTION

This invention relates to carbon nanotubes (CNTs) and more specifically to methods for forming carbon nanotube (CNT) materials and/or structures, and also the CNT materials and/or structures thereby formed.

CNTs have been proposed for a number of potential applications, including but not limited to electronic circuit applications such as field effect transistors, capacitors and/or ultracapacitors, memory arrays, traces, and switches. Numerous other applications have been proposed as well, such as structural materials, heaters and heat transfer conduits, and numerous others. Techniques for fabricating materials, components, and other structures from carbon nanotubes have often involved either coating a thin layer of previously-formed carbon nanotubes onto a substrate (e.g., by spin-coating a dispersion of carbon nanotubes in a solvent onto a substrate) or by growing CNTs onto a substrate (e.g., by chemical vapor deposition onto a catalyzed substrate). These techniques, however, result in nanoscopically thin layers of carbon nanotubes that are essentially two-dimensional. Attempts to use these techniques to form three-dimensional carbon nanotube structures or components have generally involved formation of multiple stacked layers of carbon nanotubes using these techniques. However, the formation of multiple thin carbon nanotube layers can be quite time consuming and expensive.

Accordingly, additional techniques for the formation of carbon nanotube materials, structures, and/or components are still desired.

SUMMARY OF THE INVENTION

In some aspects, embodiments disclosed herein relate to a method of forming a solid material comprising carbon nanotubes, the method comprising disposing a composition comprising carbon nanotubes and a liquid solvent into a mold cavity, freezing the liquid solvent, and removing the frozen liquid solvent by sublimation to form a solid material comprising carbon nanotubes.

In some aspects, embodiments disclosed herein relate to a nanoporous network comprising carbon nanotubes, the network having a pore size in a range from about 15 nm to about 35 nm.

In some aspects, embodiments disclosed herein relate to a nanoporous network made by a process comprising sublimation of a frozen concentrated aqueous carbon nanotube solution.

In some aspects, embodiments disclosed herein relate to a method comprising disposing a concentrated aqueous carbon nanotube solution in a mold, freezing the concentrated aqueous carbon nanotube solution, and subliming the frozen concentrated carbon nanotube solution in a vacuum chamber to provide an a nanoporous network comprising CNTs.

In some aspects, embodiments disclosed herein relate to a compressed porous carbon (CPC) article comprising a compressed nanoporous network comprising CNTs, the network having a pore size in a range from about 15 nm to about 35 nm.

In some aspects, embodiments disclosed herein relate to a composite comprising a nanoporous network comprising carbon nanotubes (CNTs), the network having a pore size in a range from about 15 nm to about 35 nm, and a matrix material.

In some aspects, embodiments disclosed herein relate to a battery comprising a cathode comprising a nanoporous network comprising carbon nanotubes (CNTs), the network having a pore size in a range from about 15 nm to about 35 nm.

In some aspects, embodiments disclosed herein relate to a supercapacitor comprising an electrode comprising a nanoporous network comprising carbon nanotubes (CNTs), the network having a pore size in a range from about 15 nm to about 35 nm.

In some aspects, embodiments disclosed herein relate to a central processing unit (CPU) thermal management element comprising a nanoporous network comprising CNTs, the network having a pore size in a range from about 15 nm to about 35 nm.

In some aspects, embodiments disclosed herein relate to an internal combustion engine block comprising a nanoporous network comprising CNTs, the network having a pore size in a range from about 15 nm to about 35 nm.

In some aspects, embodiments disclosed herein relate to a filter comprising a nanoporous network comprising CNTs, the network having a pore size in a range from about 15 nm to about 35 nm, a HEPA filter, and a pre-filter.

These and other features and advantages will become more apparent from the following description.

DETAILED DESCRIPTION

Figure 1A:
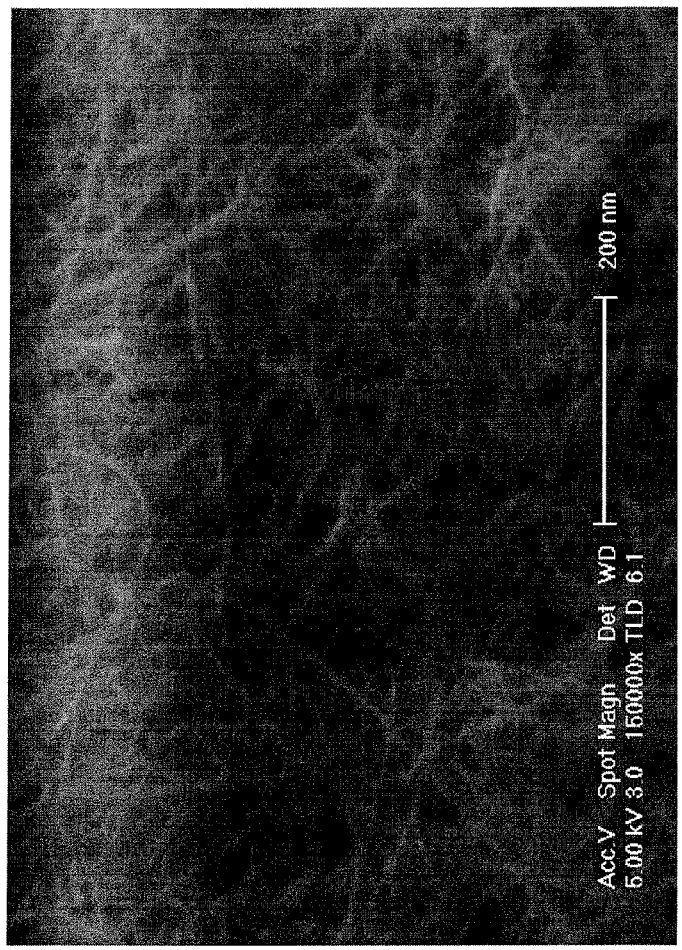
FIGS. 1a and 1b show scanning electron micrograph (SEM) images of a 20 nanometer nanoporous network comprising carbon nanotubes at two different magnifications, in accordance with embodiments of the present invention.

The present invention is directed, in part, to CNT-containing materials and/or structures. Of the many advantages, the present invention provides nanoporous networks comprising carbon nanotubes (CNTs) which can be manufactured in any two or three dimensional shape via a mold preparation, and optionally, via subsequent machining. The nanoporous networks of the invention provide a three dimensional CNT network that can be compressed while substantially maintaining a uniform nanoscale porosity. The nanoporous networks of the invention exhibit not only uniformity in the range of pore dimensions, but also uniform density of CNT material.

Although CNT aerogels have been prepared, for example, from polyvinyl alcohol (PVA)-containing gels (Bryning, M., Milkie, D., Islam, M., Hough, L., Kikkawa, J. and Yodh, A. (2007), Carbon Nanotube Aerogels. Advanced Materials, 19:661-664.), the present invention provides access to scalable quantities of highly concentrated CNT solutions, without the need for stabilizers, providing a CNT network of relatively uniform pore size classified broadly as mesoporous, i.e. in a range from about 2 to about 50 nm, such narrow range for CNT aerogel-like structures heretofore not accessed by methods known in the art.

The nanoporous networks of the present invention substantially maintain their shape and volume as they were disposed within the mold from which the nanoporous network was formed, without substantial shrinkage, thus resembling an aerogel, yet providing a structure with uniform pore size on the nanoscale. The lack of substantial shrinkage allows the nanopores to be optionally filled to provide a composite material by, for example, vacuum-assisted resin transfer techniques and similar methods. The lack of substantial shrinkage also allows the CNTs in the nanoporous network to be substantially conformally coated by standard gas phase deposition techniques, while maintaining a nanoporous structure. The lack of substantial shrinkage also means that the resultant nanoporous network comprises a very large effective surface area.

In particular embodiments, the nanoporous networks of the invention exhibit semi-conducting behavior and behave as thermoelectric materials. Testing of compressed nanoporous networks of the invention have indicated thermoelectric properties with current flows from about 120 microamps to about 1 microamp at both large and small delta T, for example, at about 1000° C. and at about 3° C. The nanoporous networks of the invention can have an emissivity greater than about 0.95 thus behaving as a black body. The nanoporous networks of the invention display a unique combination of properties including, without limitation, a high rate of convection, thermal conductivity, electrical conductivity, very high temperature tolerance, and large surface area, i.e. high porosity.

The nanoporous networks of the invention are robust to handling, including tolerance of significant compressive forces without disrupting the nanoporous network. Nanoporous networks of the invention are strong enough to obviate the need for any structure-stabilizing materials, such as PVA, allowing the nanoporous networks to be processed into roll to roll sheets if so desired.

The CNT-containing nanoporous networks of the invention serve as a springboard for preparing numerous engineered materials addressing needs in downstream applications where CNT properties are desirable. Such properties include, without limitation, enhanced thermal, electrical, and/or mechanical properties. Thus, nanoporous networks of the invention can be used in electronics, composite strengthening, heat dissipation, EMI shielding, resistive heating, solar applications, IR absorption, and radar absorption, for example.

The present invention is also directed, in part, to methods for forming carbon nanotube materials and/or structures having the nanoporous network described herein. Methods of the invention advantageously provide the nanoporous networks by a simple scalable sublimation process. While any solvent capable of sustaining sublimation may be used, the use of water alone, without the need for surfactants or other stabilizing additives, provides for a method that is environmentally friendly. Moreover, the relatively uniform pore size of the resultant nanoporous networks available through methods of the present invention, may be due, in part, to the absence of such additives which can disrupt the nascent network during the sublimation process. Methods of the invention are compatible with forming three-dimensional nanoporous networks of any shape and obviate the need for layering of substantially two dimensional CNT networks are normally employed when targeting significantly three dimensional structures. Given the guidance provided herein, other advantages will be apparent to the skilled artisan.

As used herein, the term "nanoporous" refers to a material that has pores of a size on the nanoscale. Nanoporous materials can thus have pore sizes in a range from about 1 nm to about 1000 nm.

Figure 1B:
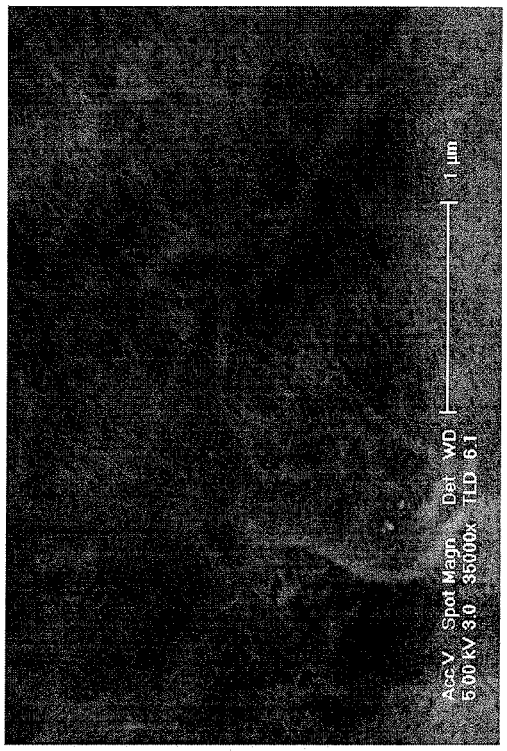

As used herein, the term "network" refers to the substantially three-dimensional array of carbon nanotubes resulting from sublimation of a concentrated CNT solution, in accordance with embodiments of methods of the invention. A "nanoporous network" of CNTs is exemplified in FIGS. 1a and 1b.

As used herein, the term "carbon nanotube" (CNT, plural CNTs) refers to any of a number of cylindrically-shaped allotropes of carbon of the fullerene family including single-walled carbon nanotubes (SWNTs), double-walled carbon nanotubes (DWNTs), multi-walled carbon nanotubes (MWNTs). CNTs can be capped by a fullerene-like structure or open-ended. CNTs include those that encapsulate other materials. CNTs can be functionalized as well.

As used herein, the term "functionalized," when used in reference to CNTs, refers to CNTs that have been subjected to a post-CNT synthesis reaction that results in the presence of a covalently-linked organic functional group. Examples of such functional groups include, without limitation, carboxylic acids, amines, alcohols, amides, esters, halogens, such as fluorine, bromine, iodine, chlorine, sulfides, sulfates, and the like.

In some embodiments, the present invention provides a nanoporous network comprising carbon nanotubes (CNTs), the network having a pore size in a range from about 15 nm to about 35 nm. In some embodiments, the nanoporous network of the invention has a pore size in a range from about 20 nm to about 30 nm. In some embodiments, the present invention provides a nanoporous network with a substantially uniform mesoporous structure. In some embodiments, the mesoporous structure includes pore sizes in a range from about 2 nm to about 50 nm. In some embodiments, the pore size is an average of about 20 nm. In some embodiments, the pore size is an average of about 25 nm. In some embodiments, the pore size is an average of about 30 nm. In some embodiment the average pore size is about 20, about 21, about 22, about 23, about 24, about 25, about 26, about 27, about 28, about 29, or about 30 nm, including fractions thereof.

In some embodiments, a pore size that is an outlier may comprise less than about 10% of the nanoporous network. In some embodiments, a pore size that is an outlier may comprise less than about 1% of the nanoporous network. In some embodiments, a pore size that is an outlier may comprise less than about 0.1% of the nanoporous network. In some embodiments, a pore size that is an outlier may comprise less than about 0.01% of the nanoporous network. In some embodiments, the nanoporous network of the invention includes outlier pore sizes not more than about 100 nm. In some embodiments, the nanoporous network of the invention includes outlier pore sizes not more than about 90 nm. In some embodiments, the nanoporous network of the invention includes outlier pore sizes not more than about 80 nm. In some embodiments, the nanoporous network of the invention includes outlier pore sizes not more than about 70 nm. In some embodiments, the nanoporous network of the invention includes outlier pore sizes not more than about 60 nm. In some embodiments, the nanoporous network of the invention includes outlier pore sizes not more than about 50 nm.

In some embodiments, the pore size may be a function CNT length. In some embodiments, the pore size may be a function of CNT concentration employed in the process of manufacturing the nanoporous network. In some embodiments, the pore size may be a function of the combination of CNT length and CNT concentration.

In some embodiments, the nanoporous network of the invention has CNTs with a length in a range from about 0.5 microns to about 5 microns. In some embodiments, the nanoporous network of the invention has CNTs with a length in a range from about 2 microns to about 3 microns, including all fractions in between. In some embodiments, longer CNTs may be employed, including those in a range from about 5 to about 20 microns, including those in a range from about 20 microns to about 50 microns, including those in a range from about 50 microns to about 100 microns, including those in a range from about 100 microns to about 500 microns, including about 100, about 200, about 300, about 400, and about 500 microns.

In some embodiments, the nanoporous network of the invention has CNTs with a diameter in a range from about 1 nm to about 500 nm. In some embodiments, the CNTs of the nanoporous network have a diameter in a range from about 1 nm to about 10 nm, including about 1, about 2, about 3, about 4, about 5, about 6, about 7, about 8, about 9, and about 10 nm, including fractions thereof. In some embodiments, the CNTs of the nanoporous network have a diameter in a range from about 10 nm to about 50 nm, including about 10, about 20, about 30, about 40 and about 50 nm, including all values in between and fractions thereof. In some embodiments, the CNTs of the nanoporous network have a diameter in a range from about 50 nm to about 500 nm, including about 50, about 100, about 150, about 200, about 250, about 300, about 350, about 400, about 450, and about 500, including all values in between and fractions thereof.

In some embodiments, the nanoporous network of the invention has CNTs that are functionalized. In some embodiments, functionalized CNTs are those that have been subjected to a post-CNT synthesis reaction that results in the presence of a covalently-linked organic functional group. Examples of such functional groups include, without limitation, carboxylic acids, amines, alcohols, amides, esters, halogens, such as fluorine, bromine, iodine, chlorine, sulfides, sulfates, and the like. In some embodiments, the functionalized CNT includes CNTs bearing the carboxylic acid functional group which can be obtained by various oxidative procedures known in the art, for example, by treatment with concentrated nitric acid. In some embodiments, the CNTs are functionalized with fluorine. In some embodiments, the CNTs are functionalized with hydrogen. In some embodiments, the CNTs are functionalized with carboxylic acid groups and are subsequently fluorinated. In some embodiments, the carboxylic acid groups of a functionalized CNT are further functionalized as an ester or amide. In some embodiments, the carboxylic acid is a metal salt, including for example, a sodium or potassium salt. In some embodiments, the carboxylic acid groups of a functionalized CNT are reacted with an amino acid or peptide. In some embodiments, the carboxylic acid groups of a functionalized CNT are reacted with a polyol. In some embodiments, the carboxylic acid groups of a functionalized CNT are reacted with a polyethylene glycol (PEG) moiety.

In some embodiments, the nanoporous network of the invention has CNTs that include at least one selected from the group consisting of single-walled CNTs (SWNTs), multi-walled CNTs (MWNTs), double-walled CNTs (DWNTs), and combinations thereof. In some embodiments, the nanoporous network comprises substantially all SWNTs. In some embodiments, the nanoporous network comprises substantially all DWNTs and MWNTs. In some embodiments, the nanoporous network comprises substantially all DWNTs and SWNTs. The choice of CNT form can be selected as a function of the downstream application of the nanoporous network, as will be apparent to the skilled artisan. The CNTs employed in the invention described herein may be prepared in a variety of ways, as is known in the art. These methods may include, but are not limited to, arc discharge through graphite electrodes, pulsed laser ablation of graphite feedstock materials, chemical vapor deposition onto a sacrificial substrate (including water-assisted chemical vapor deposition). These techniques are well-known in the art. CNT manufacturing has also become commercially viable, so that carbon nanotubes having various properties and configurations are commercially available.

In some embodiments, the present invention provides a nanoporous network made by a process comprising sublimation of a frozen concentrated aqueous carbon nanotube (CNT) solution. In some such embodiments, the nanoporous network of the invention is made by disposing a frozen concentrated aqueous CNT in a mold, followed by sublimation.

In some embodiments, the nanoporous network of the invention is made from a concentrated aqueous CNT solution by concentrating a standard aqueous CNT solution by nitrogen evaporation, whereby concentrating increases the CNT concentration by an amount in a range from about 20 times to about 60 times a concentration relative to a standard aqueous CNT solution. A standard aqueous CNT solution may comprise a dispersion of about 1 weight percent CNTs in water in the absence of additives. In some embodiments, the CNT concentration is increased by about 20 times, about 25 times, about 30 times, about 35 times, about 40 times, about 45 times, about 50 times, about 55 times, about 60 times a standard aqueous CNT solution, including all values in between and fractions thereof. Significantly, such high CNT concentrations are achieved without the benefit of additives by way of the procedures described herein.

In some embodiments, the nanoporous network of the invention is made by a process employing CNTS resulting in a pore size in a range from about 20 nm to about 30 nm. In some embodiments, the present invention provides a nanoporous network made by a process employing CNTS resulting in a substantially uniform mesoporous structure. In some embodiments, the mesoporous structure includes pore sizes in a range from about 2 nm to about 50 nm. In some embodiments, the pore size is an average of about 20 nm. In some embodiments, the pore size is an average of about 25 nm. In some embodiments, the pore size is an average of about 30 nm. In some embodiment the average pore size is about 20, about 21, about 22, about 23, about 24, about 25, about 26, about 27, about 28, about 29, or about 30 nm, including fractions thereof.

In some embodiments, the nanoporous network made by a process of the invention employs CNTs resulting in a pore size in which an outlier may comprise less than about 10% of the nanoporous network. In some embodiments, a pore size that is an outlier may comprise less than about 1% of the nanoporous network. In some embodiments, a pore size that is an outlier may comprise less than about 0.1% of the nanoporous network. In some embodiments, a pore size that is an outlier may comprise less than about 0.01% of the nanoporous network. In some embodiments, the nanoporous network of the invention includes outlier pore sizes not more than about 100 nm. In some embodiments, the nanoporous network of the invention includes outlier pore sizes not more than about 90 nm. In some embodiments, the nanoporous network of the invention includes outlier pore sizes not more than about 80 nm. In some embodiments, the nanoporous network of the invention includes outlier pore sizes not more than about 70 nm. In some embodiments, the nanoporous network of the invention includes outlier pore sizes not more than about 60 nm. In some embodiments, the nanoporous network of the invention includes outlier pore sizes not more than about 50 nm.

In some embodiments, the pore size may be a function CNT length. In some embodiments, the pore size may be a function of CNT concentration employed in the process of manufacturing the nanoporous network. In some embodiments, the pore size may be a function of the combination of CNT length and CNT concentration.

In some embodiments, the nanoporous network made by a process of the invention has CNTs with a length in a range from about 0.5 microns to about 5 microns. In some embodiments, the nanoporous network of the invention has CNTs with a length in a range from about 2 microns to about 3 microns, including all fractions in between. In some embodiments, longer CNTs may be employed, including those in a range from about 5 to about 20 microns, including those in a range from about 20 microns to about 50 microns, including those in a range from about 50 microns to about 100 microns, including those in a range from about 100 microns to about 500 microns, including about 100, about 200, about 300, about 400, and about 500 microns.

In some embodiments, the nanoporous network made by a process of the invention has CNTs with a diameter in a range from about 1 nm to about 500 nm. In some embodiments, the CNTs of the nanoporous network have a diameter in a range from about 1 nm to about 10 nm, including about 1, about 2, about 3, about 4, about 5, about 6, about 7, about 8, about 9, and about 10 nm, including fractions thereof. In some embodiments, the CNTs of the nanoporous network have a diameter in a range from about 10 nm to about 50 nm, including about 10, about 20, about 30, about 40 and about 50 nm, including all values in between and fractions thereof. In some embodiments, the CNTs of the nanoporous network have a diameter in a range from about 50 nm to about 500 nm, including about 50, about 100, about 150, about 200, about 250, about 300, about 350, about 400, about 450, and about 500, including all values in between and fractions thereof.

In some embodiments, the nanoporous network made by a process of the invention has CNTs that are functionalized. In some embodiments, functionalized CNTs are those that have been subjected to a post-CNT synthesis reaction that results in the presence of a covalently-linked organic functional group. Examples of such functional groups include, without limitation, carboxylic acids, amines, alcohols, amides, esters, halogens, such as fluorine, bromine, iodine, chlorine, sulfides, sulfates, and the like. In some embodiments, the functionalized CNT includes CNTs bearing the carboxylic acid functional group which can be obtained by various oxidative procedures known in the art, for example, by treatment with concentrated nitric acid. In some embodiments, the CNTs are functionalized with fluorine. In some embodiments, the CNTs are functionalized with hydrogen. In some embodiments, the CNTs are functionalized with carboxylic acid groups and are subsequently fluorinated. In some embodiments, the carboxylic acid groups of a functionalized CNT are further functionalized as an ester or amide. In some embodiments, the carboxylic acid is a metal salt, including for example, a sodium or potassium salt. In some embodiments, the carboxylic acid groups of a functionalized CNT are reacted with an amino acid or peptide. In some embodiments, the carboxylic acid groups of a functionalized CNT are reacted with a polyol. In some embodiments, the carboxylic acid groups of a functionalized CNT are reacted with a polyethylene glycol (PEG) moiety.

In some embodiments, the nanoporous network made by a process of the invention has CNTs that include at least one selected from the group consisting of single-walled CNTs (SWNTs), multi-walled CNTs (MWNTs), double-walled CNTs (DWNTs), and combinations thereof. In some embodiments, the nanoporous network comprises substantially all SWNTs. In some embodiments, the nanoporous network comprises substantially all DWNTs and MWNTs. In some embodiments, the nanoporous network comprises substantially all DWNTs and SWNTs. The choice of CNT form can be selected as a function of the downstream application of the nanoporous network, as will be apparent to the skilled artisan. The CNTs employed in the invention described herein may be prepared in a variety of ways, as is known in the art. These methods may include, but are not limited to, arc discharge through graphite electrodes, pulsed laser ablation of graphite feedstock materials, chemical vapor deposition onto a sacrificial substrate (including water-assisted chemical vapor deposition). These techniques are well-known in the art. CNT manufacturing has also become commercially viable, so that carbon nanotubes having various properties and configurations are commercially available.

In some embodiments, the present invention provides a method that includes disposing a concentrated aqueous CNT solution in a mold, freezing the concentrated aqueous CNT solution, and sublimating the frozen concentrated CNT solution in a vacuum chamber to provide a nanoporous network comprising CNTs.

The carbon nanotubes can be dispersed in a wide variety of solvents, depending on the desired properties of the dispersion, and the desired processing conditions for freezing and sublimating the solvent. In one exemplary embodiment, water is used as the solvent. In another exemplary embodiment, a mixture of water with a polar organic solvent such as methanol or ethanol may be used. Other solvents, such as $CO_2$ or non-polar organic solvents may also be used. Surfactants and other dispersing aids or anti-settling aids, may be used, as is known in the art. The concentration of nanotubes in the solvent may be varied depending on the desired density of the final material, with higher concentrations producing materials having greater carbon nanotube density.

The carbon nanotubes dispersed in solvent can be loaded into any sort of mold shaped to produce a desired shape for the final product. The mold may be of any material, although in one exemplary embodiment a material having good release properties (e.g., PTFE) may be used. In another exemplary embodiment, a mold release agent may be applied to the inner surface of the mold prior to disposing the carbon nanotube dispersion therein.

The conditions applied to freeze, and then sublime the solvent, can vary depending on the solvent used. For example, if water is used as the solvent, freezing may be conducted in a conventional freezer, with the liquid solution changing to a solid over a period of several hours. Flash freezing can also be performed using a super-chilled freezer and/or convection-aided freezing. Sublimation of the frozen water solvent can be performed under vacuum, as is well-known in the art, at exemplary pressures of less than 1 torr in some embodiments, and less than or equal to 500 mtorr in other embodiments. An exemplary typical sublimation pressure for water can be about 500 mtorr. Other solvents may require more extreme conditions to force them into the liquid state or to achieve sublimation of the liquid into the gaseous state. For example, $CO_2$ requires application of pressure (e.g., ≥520 kPa) in order to achieve a liquid state and requires temperatures of below −78° C. to be in a solid state at atmospheric pressure, but will readily sublime from the solid state to a gaseous state at ambient pressure and temperature conditions. Organic solvents may also require high pressures or very low temperatures to freeze and/or application of vacuum to sublime.

After sublimation is complete (signified by reaching a no-load base pressure in an exemplary embodiment where sublimation is performed under a vacuum), the resulting solid material comprising carbon nanotubes can be removed from the mold for use in an application. The material may be further shaped, machined, or otherwise processed using known techniques, depending on the requirements of the end-use application.

In some embodiments, methods of the invention include providing a concentrated aqueous CNT solution by concentrating a standard aqueous CNT solution by nitrogen evaporation, the concentrating step increasing the CNT concentration by an amount in a range from about 20 times to about 60 times a concentration of said standard aqueous CNT solution. $N_2$ vacuum concentrate method gently removes the water content from the standard starting solution. The process is conducted in a manner as not to disrupt the stability of the solution. If the solution becomes unstable the CNTs can cluster.

In some embodiments, the process of concentrating an aqueous CNT solution, in particular, begins with a water based, functionalized, stable, CVD carbon nanotube solution having a target optical density of about 2.0. In some embodiments, the CNT functionalization is a carboxylic acid functionalized CNT, for example, as might be obtained by oxidizing an end cap of a CNT or at defect sites along the CNT tube periphery. In some embodiments, a pre-filter process can be used to remove contaminants in the standard aqueous CNT solution, such pre-filter being about 4 microns in size or greater.

In some embodiments, the CNT solution is transferred into a polypropylene or Teflon container. These containers can enhance the ability to maintain a convex meniscus. A loss of CNT material can occur during the concentration process, if the solution has a stronger attraction to the container than to itself. In some embodiments, the CNT solution is next placed inside a vacuum oven. The container can be optionally placed on a low heat conductive stage such as an inverted Pyrex dish. The stage can reduce direct heat transfer from the oven walls to the solution container. The concentration process can include evacuating the chamber to a reduced pressure. In some such embodiments, the pressure can be reduced to about 20 inches of mercury. In some embodiments, the temperature is controlled. For example, in some embodiments, the temperature can be controlled to about 50° C. One skilled in the art will recognize that these conditions are merely exemplary. Any set of conditions sufficient to provide an evaporation rate in a range from about 3 to about 5 mL/hr is beneficially targeted.

In some embodiments, the resultant concentrated solution is stable with a concentration about 20 to about 50 times that of the starting solution. With respect to aqueous systems in particular, it has been indicated that attempts to concentrate a solution by other methods known in the art have yielded usable solutions that are about 8 to about 10 times more concentrated than a standard aqueous CNT solution. Concentrating the standard solution by these methods beyond this concentration yields a product that is unstable and forms large CNT clusters which is undesirable for many applications.

In some embodiments, methods of the invention employ CNTs resulting in a nanoporous network having a pore size in a range from about 20 nm to about 30 nm. In some embodiments, the present invention provides a nanoporous network made by a process employing CNTs resulting in a substantially uniform mesoporous structure. In some embodiments, the mesoporous structure includes pore sizes in a range from about 2 nm to about 50 nm. In some embodiments, the pore size is an average of about 20 nm. In some embodiments, the pore size is an average of about 25 nm. In some embodiments, the pore size is an average of about 30 nm. In some embodiment the average pore size is about 20, about 21, about 22, about 23, about 24, about 25, about 26, about 27, about 28, about 29, or about 30 nm, including fractions thereof.

In some embodiments, methods of the invention employ CNTs resulting in a nanoporous network having a pore size in which an outlier may comprise less than about 10% of the nanoporous network. In some embodiments, a pore size that is an outlier may comprise less than about 1% of the nanoporous network. In some embodiments, a pore size that is an outlier may comprise less than about 0.1% of the nanoporous network. In some embodiments, a pore size that is an outlier may comprise less than about 0.01% of the nanoporous network. In some embodiments, the nanoporous network of the invention includes outlier pore sizes not more than about 100 nm. In some embodiments, the nanoporous network of the invention includes outlier pore sizes not more than about 90 nm. In some embodiments, the nanoporous network of the invention includes outlier pore sizes not more than about 80 nm. In some embodiments, the nanoporous network of the invention includes outlier pore sizes not more than about 70 nm. In some embodiments, the nanoporous network of the invention includes outlier pore sizes not more than about 60 nm. In some embodiments, the nanoporous network of the invention includes outlier pore sizes not more than about 50 nm.

In some embodiments, the pore size may be a function CNT length. In some embodiments, the pore size may be a function of CNT concentration employed in the process of manufacturing the nanoporous network. In some embodiments, the pore size may be a function of the combination of CNT length and CNT concentration.

In some embodiments, methods of the invention employ CNTs having a length in a range from about 0.5 microns to about 5 microns. In some embodiments, the nanoporous network of the invention has CNTs with a length in a range from about 2 microns to about 3 microns, including all fractions in between. In some embodiments, longer CNTs may be employed, including those in a range from about 5 to about 20 microns, including those in a range from about 20 microns to about 50 microns, including those in a range from about 50 microns to about 100 microns, including those in a range from about 100 microns to about 500 microns, including about 100, about 200, about 300, about 400, and about 500 microns.

In some embodiments, methods of the invention employ CNTs having a diameter in a range from about 1 nm to about 500 nm. In some embodiments, the CNTs of the nanoporous network have a diameter in a range from about 1 nm to about 10 nm, including about 1, about 2, about 3, about 4, about 5, about 6, about 7, about 8, about 9, and about 10 nm, including fractions thereof. In some embodiments, the CNTs of the nanoporous network have a diameter in a range from about 10 nm to about 50 nm, including about 10, about 20, about 30, about 40 and about 50 nm, including all values in between and fractions thereof. In some embodiments, the CNTs of the nanoporous network have a diameter in a range from about 50 nm to about 500 nm, including about 50, about 100, about 150, about 200, about 250, about 300, about 350, about 400, about 450, and about 500, including all values in between and fractions thereof.

In some embodiments, methods of the invention employ CNTs that are functionalized. In some embodiments, functionalized CNTs are those that have been subjected to a post-CNT synthesis reaction that results in the presence of a covalently-linked organic functional group. Examples of such functional groups include, without limitation, carboxylic acids, amines, alcohols, amides, esters, halogens, such as fluorine, bromine, iodine, chlorine, sulfides, sulfates, and the like. In some embodiments, the functionalized CNT includes CNTs bearing the carboxylic acid functional group which can be obtained by various oxidative procedures known in the art, for example, by treatment with concentrated nitric acid. In some embodiments, the CNTs are functionalized with fluorine. In some embodiments, the CNTs are functionalized with hydrogen. In some embodiments, the CNTs are functionalized with carboxylic acid groups and are subsequently fluorinated. In some embodiments, the carboxylic acid groups of a functionalized CNT are further functionalized as an ester or amide. In some embodiments, the carboxylic acid is a metal salt, including for example, a sodium or potassium salt. In some embodiments, the carboxylic acid groups of a functionalized CNT are reacted with an amino acid or peptide. In some embodiments, the carboxylic acid groups of a functionalized CNT are reacted with a polyol. In some embodiments, the carboxylic acid groups of a functionalized CNT are reacted with a polyethylene glycol (PEG) moiety.

In some embodiments, methods of the invention employ CNTs that include at least one selected from the group consisting of single-walled CNTs (SWNTs), multi-walled CNTs (MWNTs), double-walled CNTs (DWNTs), and combinations thereof. In some embodiments, the nanoporous network comprises substantially all SWNTs. In some embodiments, the nanoporous network comprises substantially all DWNTs and MWNTs. In some embodiments, the nanoporous network comprises substantially all DWNTs and SWNTs. The choice of CNT form can be selected as a function of the downstream application of the nanoporous network, as will be apparent to the skilled artisan. The CNTs employed in the invention described herein may be prepared in a variety of ways, as is known in the art. These methods may include, but are not limited to, arc discharge through graphite electrodes, pulsed laser ablation of graphite feedstock materials, chemical vapor deposition onto a sacrificial substrate (including water-assisted chemical vapor deposition). These techniques are well-known in the art. CNT manufacturing has also become commercially viable, so that carbon nanotubes having various properties and configurations are commercially available.

Figure 2:
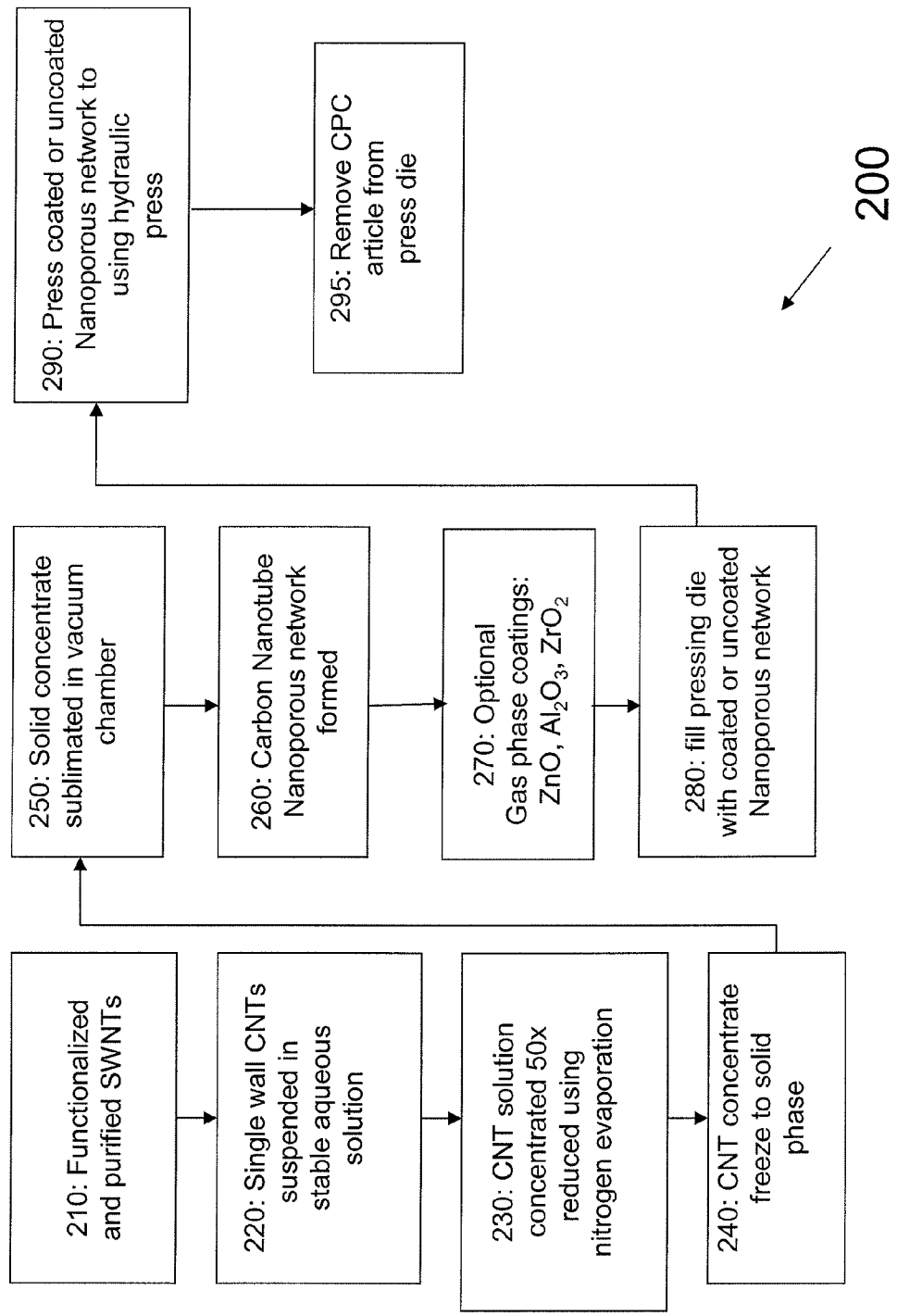
FIG. 2 shows a flow diagram for making a nanoporous network and compressed nanoporous network, in accordance with embodiments of the present invention.
Figure 3A:
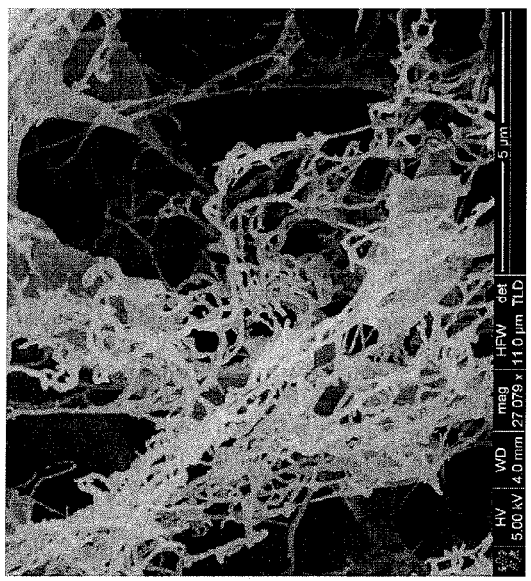
FIG. 3a shows a (SEM) image of a zinc oxide coated nanoporous network comprising CNTs prior to compression, in accordance with embodiments of the invention.
Figure 3B:
FIG. 3b shows a SEM image of the zinc oxide coated nanoporous network of FIG. 3a at higher magnification.

Thus far, methods of the invention have been described for the production of nanoporous networks that have a variety of utilities. However, the resultant nanoporous network can be employed in further processing as outlined in the exemplary flow scheme of FIG. 2. Thus, in some embodiments, methods of the invention further comprise compressing the nanoporous network in a hydraulic press to provide a compressed porous carbon (CPC) article. Referring to FIG. 2, a method 200 for preparing a CPC article is shown. Method 200 begins at step 210 providing functionalized, purified SWNTs. It should be understood, that this scheme is merely illustrative and the CNTs employed could be any combination of CNTs as disclosed herein above. At step 220, the SWNTs are suspended in a stable aqueous solution. This may be any of the standard solution of CNTs as described above. Step 230 concentrates the standard CNT solution, as shown by the exemplary amount of 50 times relative to the standard CNT solution. The CNT concentrate is frozen to a solid at step 240 and the resultant solid sublimed in a vacuum chamber at step 250. Completion of the sublimation process allows release of a nanoporous network of the invention at step 260. At this stage, the nanoporous network can be subjected to an optional gas phase coating as shown in step 270. In some embodiments, methods of the invention for forming a CPC article comprise gas phase coating the nanoporous network with at least one coating agent comprising one selected from the group consisting of $ZnO$, $Al_2O_3$, and $ZrO_2$ to provide a coated nanoporous network. An exemplary coated nanoporous network of the invention has been prepared using zinc oxide coating as shown in FIG. 3a and FIG. 3b. Any number of coatings can be employed on the nanoporous network and the exact choice of coatings can be a function of the downstream applications. For example, in some embodiments, the coatings employed may include a multi-layer thermal protection system (TPS). In some such embodiments, layers may include a waterproof layer, a sacrificial ablative layer, a tensile or compressive layer, an embedded sensors layer, and a low thermally conductive layer. In some embodiments, a coating step may be employed without subsequent compression to form other articles for alternate downstream applications.

Figure 4:
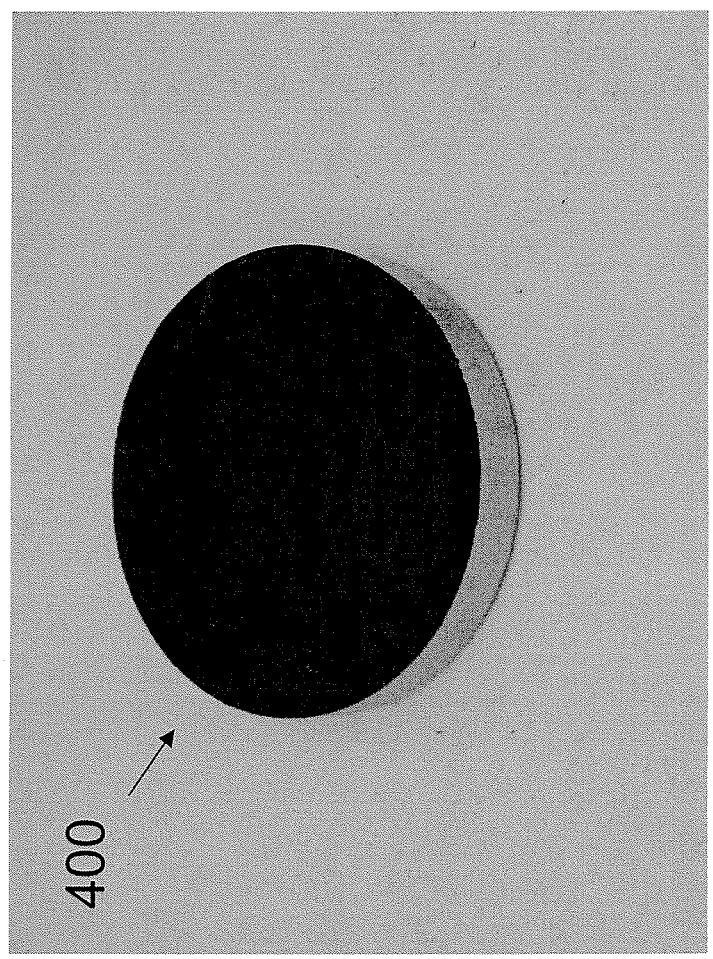
FIG. 4 shows a compressed porous carbon (CPC) disk comprising carbon nanotubes, in accordance with embodiments of the present invention.

Continuing the CPC production method, the coated or uncoated nanoporous network can be loaded into a pressing die at step 280 and the coated or uncoated nanoporous network compressed at step 290. The material is then released from the press at step 295. An exemplary compressed coated nanoporous network has been prepared in accordance with methods disclosed herein, as shown in FIG. 4. The disk in FIG. 4 is about 260 microns thick, weighs about 0.35 g, and is about 40 mm diameter. Disks such as that shown in FIG. 4 have displayed a resistance of about 2 to about 3 ohms. In some embodiments, methods of the invention can compress the uncoated or coated nanoporous network in a hydraulic press to provide an uncoated or coated CPC article. In some embodiments, a pressure exerted on the nanoporous network can include pressures up to about 25 tons without adversely affecting the nanoporous network.

In some embodiments, methods of the invention can diverge from step 260 in FIG. 2 to access other materials. For example, in some embodiments, methods of the present invention include infusing the nanoporous network with a matrix material to form a composite. In some embodiments the matrix material is infused by vacuum-assisted resin transfer. In some embodiments, the matrix material is infused by powder impregnation, with subsequent melting and/or sintering depending on the matrix material. In some such embodiments, the powder employed can be a nanopowder or nanoparticle. One skilled in the art will recognize that any procedure commonly employed in the art of composite manufacture can be used, including, without limitation, resin transfer molding (RTM), hand layup open molding, compression molding, thermoforming, autoclave molding, impregnation with the fully polymerized matrix through melt or solvent impregnation, powder impregnation, throwing, slipcasting, tape casting, injection molding, dry pressing, isostatic pressing, hot isostatic pressing (HIP), and the like. One skilled in the art will recognize that the specific technique used in the manufacture of a composite will be a function of the matrix material employed.

In some embodiments, methods of the invention can further include machining the nanoporous network to a desired size and shape. In some embodiments, this can be done immediately after step 260 in FIG. 2. In other embodiments, this can be done after coating step 270. In still other embodiments, this can be done after compression step 290. In yet still further embodiments, this can be done after forming a composite.

In some embodiments, the present invention provides a compressed porous carbon (CPC) article comprising a compressed nanoporous network comprising CNTs, the network having a pore size in a range from about 15 nm to about 35 nm. CPC articles of the present invention are provided based on the corresponding nanoporous network as described above. Thus, briefly, in some embodiments the CPC article of the invention has a pore size in a range from about 20 nm to about 30 nm. In some embodiments, CPC articles of the invention have CNTs with a length in a range from about 0.5 microns to about 5 microns. In some embodiments, CPC articles of the invention have CNTs with a diameter in a range from about 1 nm to about 500 nm. In some embodiments, CPC articles of the invention have CNTs that are functionalized. In some such embodiments, the CNTs have carboxylic acid functionalization. In some embodiments, CPC articles of the invention include CNTs comprising at least one selected from the group consisting of single-walled CNTs, multi-walled CNTs, double-walled CNTs, and combinations thereof.

In some embodiments, CPC articles of have CNTs in the nanoporous network that are coated with at least one coating agent comprising one selected from the group consisting of ZnO, $Al_2O_3$, and $ZrO_2$. In some embodiments, CPC articles of the invention have CNTs in the nanoporous network that are coated with multiple layers.

CPC production, as described herein above, is easily scalable and low cost. Lightweight CPC articles of the present invention can be used to reduce space, missile, rocket and jet payloads. CPC articles of the present invention combine the thermal convection properties of the nanoporous network of the invention with the unique characteristic of compressibility. CPC articles of the invention possess excellent structural integrity achieved through the pressing process, while maintaining morphology properties of the nanoporous network. In some embodiments, the nanoporous network porosity is tunable. In some such embodiments, the porosity can be selected to provide superior convection properties.

CPC articles of the invention can provide lightweight thermal protection systems (TPS) for space vehicles and satellites. Next generation UAVs can be constructed entirely from CPC articles of the invention allowing multiple missions into orbit and sub-orbit. Lightweight aerodynamic TPS can also be useful in hypersonic aircraft. CPC articles can bed used for reduced thermal signature applications for jet exhausts, in reduced thermal IR signature for ground based equipment and systems. CPC articles of the invention can be used in shielding and rapid cool down or convection. CPC articles of the invention can be provided in a roll to roll fabric for field and custom applications.

In some embodiments, the present invention provides a composite comprising a nanoporous network comprising carbon nanotubes (CNTs), the network having a pore size in a range from about 15 nm to about 35 nm, and a matrix material. Composites of the present invention are provided based on the corresponding nanoporous network as described above. Thus, briefly, in some embodiments the composites of the invention employ CNTs having a pore size in a range from about 20 nm to about 30 nm. In some embodiments, composites of the invention have CNTs with a length in a range from about 0.5 microns to about 5 microns. In some embodiments, composites of the invention have CNTs with a diameter in a range from about 1 nm to about 500 nm. In some embodiments, composites of the invention have CNTs that are functionalized. In some such embodiments, the CNTs have carboxylic acid functionalization. In some embodiments, the carboxylic acid functional group can be used advantageously to covalently link the nanoporous network to the matrix material. In some embodiments, composites of the invention include CNTs comprising at least one selected from the group consisting of single-walled CNTs, multi-walled CNTs, double-walled CNTs, and combinations thereof.

In some embodiments, the matrix material is a low viscosity polymer, epoxy, or resin. In some such embodiments, the matrix material can be cyanoacrylate. In some embodiments, the matrix material is a metal. In some embodiments, the matrix material is a ceramic. In some embodiments, one can infuse the nanoporous network prepared as described herein with a polymer. Low viscosity polymers, and curable resin systems such as epoxies, 2K urethanes, cyanoacrylates, and the like, can readily penetrate the three-dimensional nanoporous network and then be solidified. The carbon nanotubes of the nanoporous network of the invention provide a large number of contact points for bonding with the polymer, resulting in a high-strength material potentially having different characteristics compared to conventional nanotube-reinforced resin systems where the carbon nanotubes are dispersed in the polymer or resin precursor mixture prior to molding. As recognized by those skilled in the art, such systems can have low CNT loading due issues of viscosity on mixing CNTs into the matrix material. Composites of the invention can be used for a number of applications, including but not limited to, personnel armor, UAV applications, rotor blades, weapon components, and lightweight high strength vehicle components.

In some embodiments, a "matrix material" refers to a bulk material than can serve to fill the void volumes of the nanoporous network. The matrix material can benefit from the presence of the nanoporous network by imparting some aspects of the physical and/or chemical properties of the network to the matrix material. Matrix materials can include, for example, an epoxy, a polyester, a vinylester, a polyetherimide, a polyetherketoneketone, a polyphthalamide, a polyetherketone, a polytheretherketone, a polyimide, a phenolformaldehyde, and a bismaleimide. Matrix materials useful in the present invention can include any of the known matrix materials (see Mel M. Schwartz, Nanocomposite Materials Handbook (2d ed. 1992)). Matrix materials more generally can include resins (polymers), both thermosetting and thermoplastic, metals, ceramics, and cements.

Thermosetting resins useful as matrix materials include phthalic/maelic type polyesters, vinyl esters, epoxies, phenolics, cyanates, bismaleimides, and nadic end-capped polyimides (e.g., PMR-15). Thermoplastic resins include polysulfones, polyamides, polycarbonates, polyphenylene oxides, polysulfides, polyether ether ketones, polyether sulfones, polyamide-imides, polyetherimides, polyimides, polyarylates, and liquid crystalline polyester.

Metals useful as matrix materials include alloys of aluminum such as aluminum 6061, 2024, and 713 aluminum braze. Ceramics useful as matrix materials include carbon ceramics, such as lithium aluminosilicate, oxides such as alumina and mullite, nitrides such as silicon nitride, and carbides such as silicon carbide. Cements useful as matrix materials include carbide-base cements (tungsten carbide, chromium carbide, and titanium carbide), refractory cements (tungsten-thoria and barium-carbonate-nickel), chromium-alumina, nickel-magnesia iron-zirconium carbide. Any of the above-described matrix materials can be used alone or in combination. In some embodiments, any of the forgoing matrix materials can be incorporated in the void volume of the nanoporous network via a nanopowder or nanoparticle formulation.

In one exemplary embodiment, a nanoporous network or other downstream products, such as CPC articles or composites, prepared as described herein may be used as a in an energy storage device such as battery or supercapacitor. The three-dimensional open nanoporous network of CNTs provides a vast surface area for stored charge in, for example, a supercapacitor. As pressure on clean energy sources increases, so does the demand on energy storage devices such as the supercapicitor. The nanoporous network, CPC articles, or composites can be molded into an infinite number of shapes enhancing the usable applications for batteries and supercapacitors. With respect to supercapicitors, in particular, the supercapacitor charges and discharges relatively quickly making it very useful for acceleration duties in automotive applications.

In some embodiments, the present invention provides a battery comprising a cathode comprising a nanoporous network comprising carbon nanotubes (CNTs), the network having a pore size in a range from about 15 nm to about 35 nm. In some embodiments, the nanoporous network in batteries of the invention has a pore size in a range from about 20 nm to about 30 nm.

In some embodiments, the nanoporous network in batteries of the invention has CNTs with a length in a range from about 0.5 microns to about 5 microns. In some embodiments, the nanoporous network in batteries of the invention has CNTs with a diameter in a range from about 1 nm to about 500 nm. In some embodiments, the nanoporous network in batteries of the invention has CNTs that are functionalized. In some such embodiments, the CNTs are functionalized with carboxylic acid functionalization. In some embodiments, the nanoporous network in batteries of the invention have CNTs comprising at least one selected from the group consisting of single-walled CNTs, multi-walled CNTs, double-walled CNTs, and combinations thereof. In some such embodiments, the CNTs comprise substantially all SWNTs.

In some embodiments, the present invention provides a supercapacitor comprising an electrode comprising a nanoporous network comprising carbon nanotubes (CNTs), the network having a pore size in a range from about 15 nm to about 35 nm. In some embodiments, the nanoporous network in supercapacitors of the invention has a pore size in a range from about 20 nm to about 30 nm.

In some embodiments, the nanoporous network in supercapacitors of the invention has CNTs with a length in a range from about 0.5 microns to about 5 microns. In some embodiments, the nanoporous network in supercapacitors of the invention has CNTs with a diameter in a range from about 1 nm to about 500 nm. In some embodiments, the nanoporous network in supercapacitors of the invention has CNTs that are functionalized. In some such embodiments, the CNTs are functionalized with carboxylic acid functionalization. In some embodiments, the nanoporous network in supercapacitors of the invention have CNTs comprising at least one selected from the group consisting of single-walled CNTs, multi-walled CNTs, double-walled CNTs, and combinations thereof. In some such embodiments, the CNTs comprise substantially all SWNTs.

Figure 6:
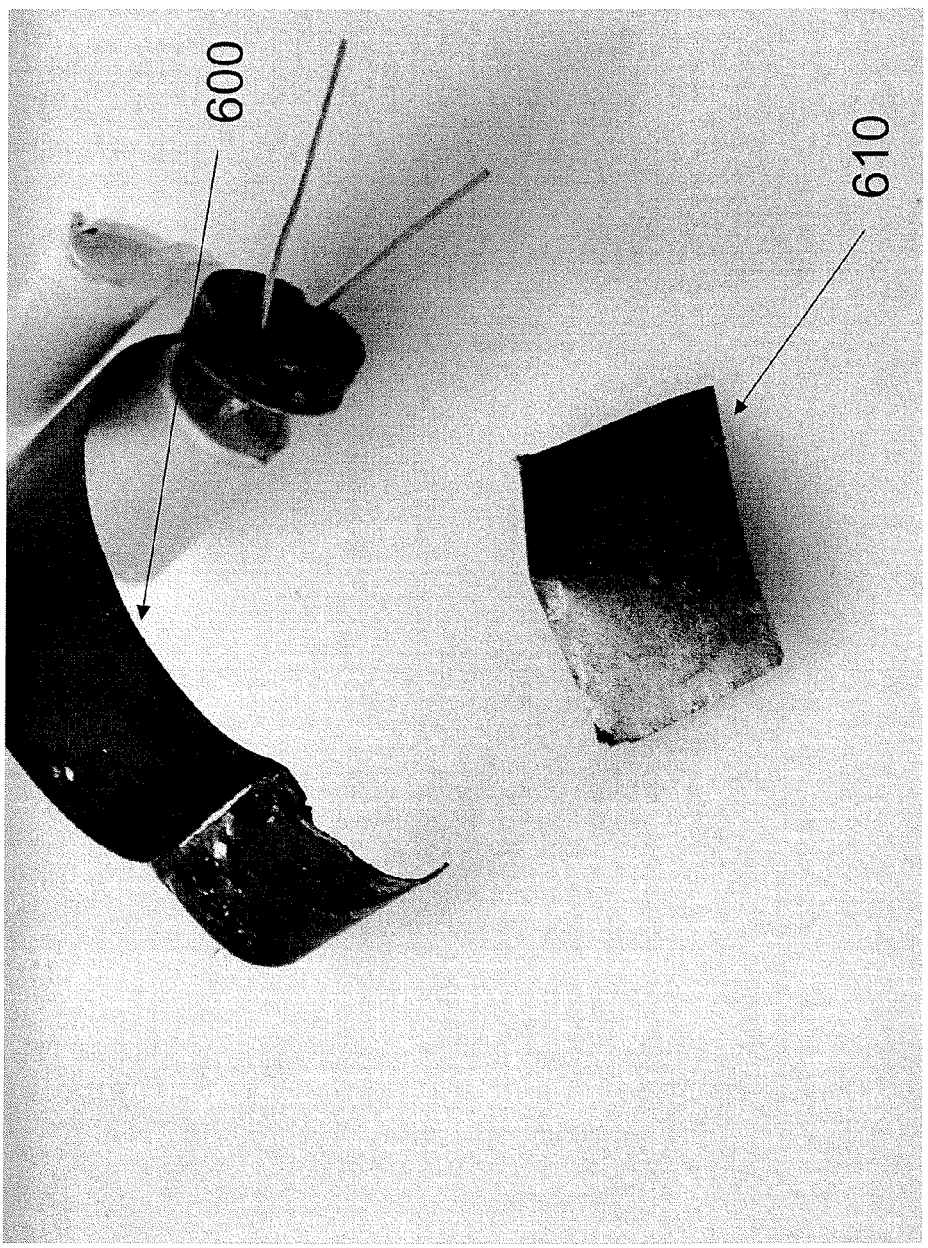
FIG. 6 shows a comparison of a typical activated carbon-based electrode and a fabricated electrode comprising a compressed porous carbon (CPC) material comprising a compressed nanoporous network comprising CNTs, in accordance with embodiments of the present invention.

Application to the above described energy storage devices is shown in FIG. 6. FIG. 6 shows a typical activated charcoal enabled supercapacitor electrode 600 and a 25 ton compression CPC electrode 610. The CPC electrode of the invention is highly porous with an ultra high surface area. Fabrication methods of the invention are suitable for application of CPC articles as both supercapacitor and lithium ion battery electrodes.

In some embodiments, the present invention provides a central processing unit (CPU) thermal management element comprising a nanoporous network comprising CNTs, said network having a pore size in a range from about 15 nm to about 35 nm. In some embodiments, the nanoporous network in CPU thermal management elements of the invention has a pore size in a range from about 20 nm to about 30 nm.

In some embodiments, the nanoporous network in CPU thermal management elements of the invention has CNTs with a length in a range from about 0.5 microns to about 5 microns. In some embodiments, the nanoporous network in CPU thermal management elements of the invention has CNTs with a diameter in a range from about 1 nm to about 500 nm. In some embodiments, the nanoporous network in CPU thermal management elements of the invention has CNTs that are functionalized. In some such embodiments, the CNTs are functionalized with carboxylic acid functionalization. In some embodiments, the nanoporous network in CPU thermal management elements of the invention have CNTs comprising at least one selected from the group consisting of single-walled CNTs, multi-walled CNTs, double-walled CNTs, and combinations thereof. In some such embodiments, the CNTs comprise substantially all SWNTs.

Figure 7:
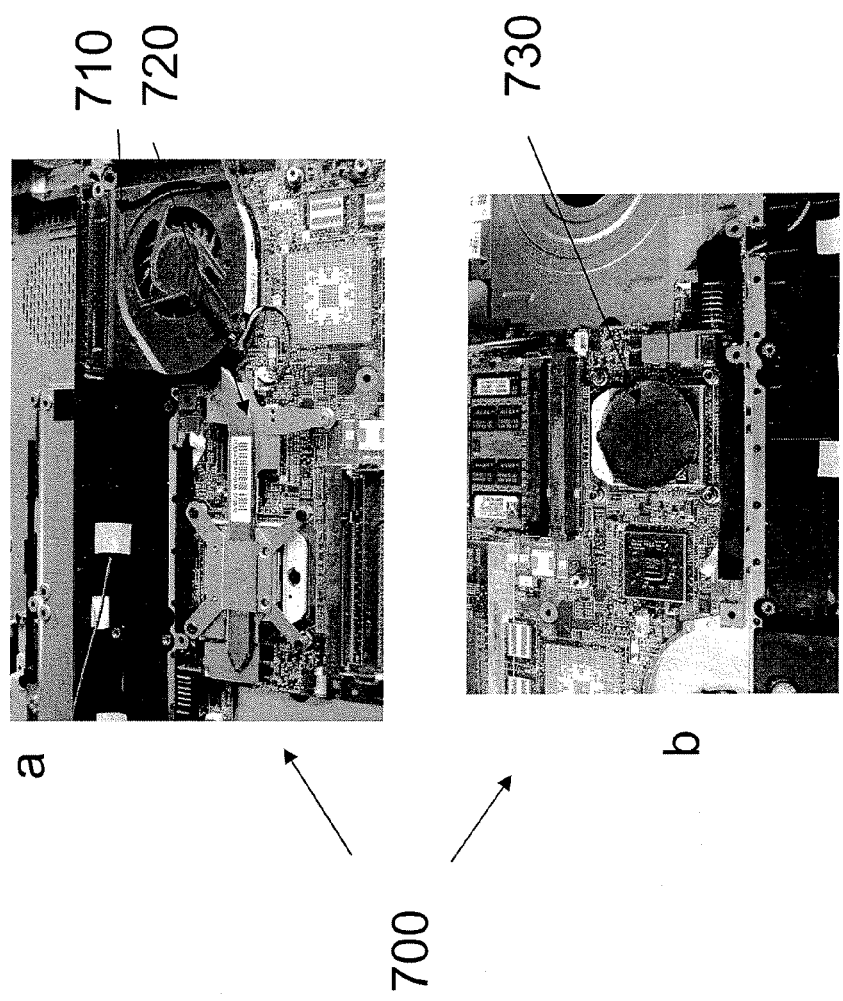
FIG. 7a shows a cooling fan and pipe in typical central processing unit (CPU).
FIG. 7b shows replacement of the cooling fan and pipe of FIG. 6a with a compressed porous carbon (CPC) material comprising a compressed nanoporous network in accordance with embodiments of the present invention.

FIG. 7A shows heat pipe 720 and fan module 710 in a typical CPU. FIG. 7B shows the use of a CPC article as a CPU thermal management element 730, in accordance with embodiments of the present invention. Notably, the mass saving is expected to be significant by this replacement of the heat pipe/fan module with the CPC article. For example, a typical fan/heat pipe module weighs about 220 g. By contrast, CPC thermal management element 730 weighs just about 1.5 g.

In some embodiments, the present invention provides an internal combustion engine block comprising a nanoporous network comprising CNTs, the network having a pore size in a range from about 15 nm to about 35 nm. In some embodiments, the nanoporous network in internal combustion engine blocks of the invention has a pore size in a range from about 20 nm to about 30 nm.

In some embodiments, the nanoporous network in internal combustion engine blocks of the invention has CNTs with a length in a range from about 0.5 microns to about 5 microns. In some embodiments, the nanoporous network in internal combustion engine blocks of the invention has CNTs with a diameter in a range from about 1 nm to about 500 nm. In some embodiments, the nanoporous network in internal combustion engine blocks of the invention has CNTs that are functionalized. In some such embodiments, the CNTs are functionalized with carboxylic acid functionalization. In some embodiments, the nanoporous network in internal combustion engine blocks of the invention have CNTs comprising at least one selected from the group consisting of single-walled CNTs, multi-walled CNTs, double-walled CNTs, and combinations thereof. In some such embodiments, the CNTs comprise substantially all SWNTs.

Figure 8:
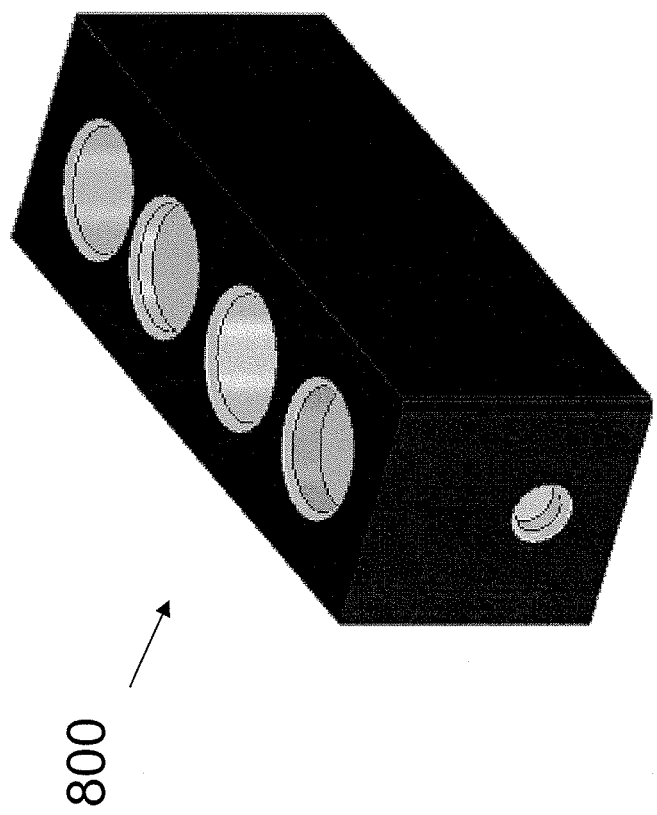
FIG. 8 shows internal combustion (IC) engine block comprising a compressed porous carbon material comprising a compressed nanoporous network comprising CNTs in accordance with embodiments of the present invention.

FIG. 8 shows a CPC-based internal combustion engine block 800. Engine block 800 has a low weight and exhibits efficient thermal conduction. Traditional hydronic cooling systems may be unnecessary utilizing a CPC-based internal combustion engine block. A power steering module may not be needed in some applications. Cumulative weight and efficiency improvements are significantly increased with CPC-based internal combustion engine block, with the added simplicity reducing vehicle component count and cost.

In some embodiments, the present invention provides a filter comprising a nanoporous network comprising CNTs, the network having a pore size in a range from about 15 nm to about 35 nm, a HEPA filter, and a pre-filter. In some embodiments, the nanoporous network in filters of the invention has a pore size in a range from about 20 nm to about 30 nm.

In some embodiments, the nanoporous network in filters of the invention has CNTs with a length in a range from about 0.5 microns to about 5 microns. In some embodiments, the nanoporous network in filters of the invention has CNTs with a diameter in a range from about 1 nm to about 500 nm. In some embodiments, the nanoporous network in filters of the invention has CNTs that are functionalized. In some such embodiments, the CNTs are functionalized with carboxylic-acid functionalization. In some embodiments, the nanoporous network in filters of the invention have CNTs comprising at least one selected from the group consisting of single-walled CNTs, multi-walled CNTs, double-walled CNTs, and combinations thereof. In some such embodiments, the CNTs comprise substantially all SWNTs.

Figure 9:
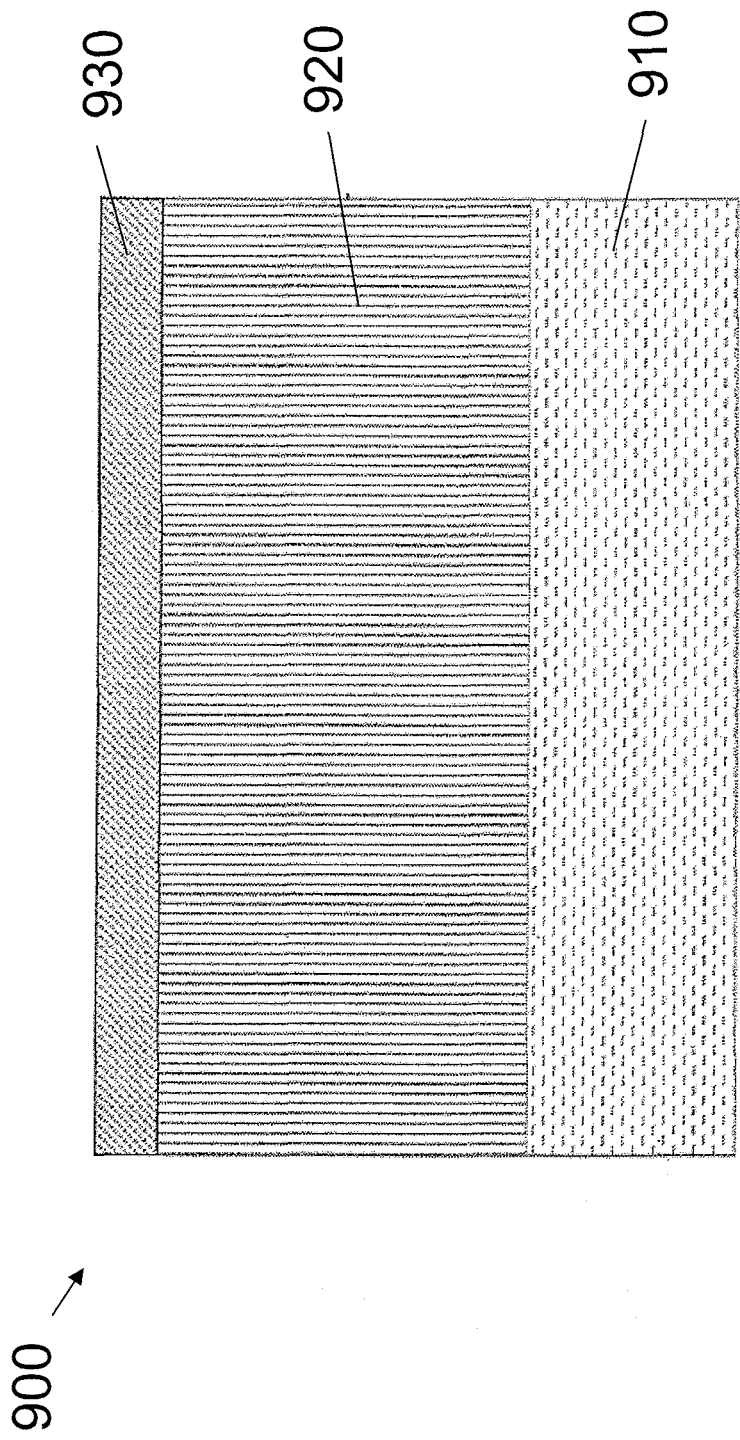
FIG. 9 shows a filter comprising a nanoporous network comprising CNTs in accordance with embodiments of the present invention.

In exemplary embodiment, a material prepared as described herein may be used as in filter media applications. Modem HEPA filters use a fiber material manufactured from individual fibers to create a filter rated to about 0.3 microns. The three-dimensional carbon nanotube material can increase the filtering performance of a HEPA filter by at least ten-fold. The nanoporous network has a pore size between 20-30 nanometers, in one exemplary embodiment, and such network can be the last stage of a conventional type HEPA filter. FIG. 9 shows a filter 900, in accordance with embodiments of the present invention. Filter 900 is equipped, in the direction of air flow, with a pre-filter 930, a standard HEPA filter 920 attached to pre-filter 930, and a nanoporous network 910 attached to HEPA filter 920.

It is understood that modifications which do not substantially affect the activity of the various embodiments of this invention are also included within the definition of the invention provided herein. Accordingly, the following examples are intended to illustrate but not limit the present invention.

Example I

This Example shows the preparation of a concentrated aqueous CNT solution.

The base solution used was a water based, functionalized, stable, CVD carbon nanotube solution wherein the solution had an optical density of 2.0. A pre-filter process removed contaminants in the standard solution 4 microns in size or greater. Filtration was performed with a McMaster-Carr (Part#92715T113) 4 micron 304 stainless mesh, 12-inch×12 inch in conjunction with a 3-inch polystyrene funnel A 4-inch round circle was cut from the filter mesh sheet. The filter mesh was folded into a cone shape and cleaned using isopropal alcohol (IPA) applied with an airbrush. The moistened mesh cone was placed into the poly funnel and the CNT solution was poured into mesh cone.

The filter was removed from cone before solution drying and was reverse flushed with IPA. The solution was transferred into a 500 mL polypropylene or Teflon container and the container placed inside a vacuum oven. The container was placed on an inverted Pyrex dish. chamber was evacuated to about 20 inches of mercury. An $N_2$ vent was opened just enough to deflect the vacuum gage. The temperature control was adjusted to 50° C. The evaporation rate was maintained at approximately 3-5 mL/hr. The sample was removed from the oven chamber when the desired concentration was met. The finished product obtained from several such runs was a stable solution with an achieved concentration up to about 60 times that of the starting solution depending on the length of time.

Example II

This Example shows the preparation of a nanoporous network.

A cavity is machined having the size and shape for the desired structure from a suitable block of material, such as PTFE. This serves as the mold. The mold is filled with the $N_2$ vacuum concentrate aqueous solution of Example I to fill the cavity. The sample is then frozen in a common freezer. Some minimal expansion of the structure from the freezing process does occur. The mold is then transferred into a vacuum chamber and the chamber evacuated to less than about 1 Torr, with about 500 mT being a typical pressure. The vacuum chamber should be capable of sustaining a pressure of less than 1 torr during the entire sublimation process, typically bout 500 mTorr through the entire process. The sample is removed from the vacuum chamber once the system base pressure is reached. No load base pressure of the rough vacuum system should be established prior to the sublimation process. The nanoporous network is obtained as an aerogel-like structure after removal from the mold.

Example III

This Example shows the preparation of a coated nanoporous network.

All reagents used in the procedure below are readily available through Sigma-Aldrich (Milwaukee, Wis.). A base line pressure is first established in an Atomic Layer Deposition (ALD) chamber. The nanoporous network is then loaded into the vacuum chamber. The vacuum chamber is evacuated pumping until base line pressure is achieved. The temperature of the chamber ramped to about 200° C. Deposition is commenced under parameters specific to the coating reagent being employed, as described below. When deposition is complete the chamber is vented and the sample removed.

Sample process parameters for $Al_2O_3$ utilize the precursor trimethalaluminum (TMA) with water reactant. Valve pulse duration for TMA and water is about 160 msec with a process pressure range of about 250 mtorr, with an $N_2$ purge of about 5 sccm over about 100 pulse cycles. The resultant product should have a coating thickness between about 90 to about 100 angstroms.

Sample process parameters for ZnO utilize the precursor diethyl zinc with water reactant. Valve pulse duration for diethyl zinc and water is about 160 msec with a process pressure range of about 200 mtorr, with an $N_2$ purge of about 3 sccm over about 100 pulse cycles. The resultant product should have a coating thickness between about 90 to about 100 angstroms.

Sample process parameters for $ZrO_2$ utilize the precursor zirconium with water reactant. Valve pulse duration for zirconium and water is about 160 msec with a process pressure range of about 270 mtorr, with an $N_2$ purge of about 5 sccm over about 100 pulse cycles. The resultant product should have a coating thickness of about 100 angstroms.

Example IV

This Example shows the preparation of a CPC article.

For preparing a disk similar to that shown in FIG. 4, about 1.5 g nanoporous network (coated) is placed into a compression die. Using a diaphragm pump, the die is evacuated to about 25 inches of mercury. The hydraulic press is then compressed to about 25 tons. The pressure is then released and the diaphragm pump turned off and the CPC structure removed from the pressing die.

Example V

The Example shows heat dissipation in a CPC article.

3-minute MAPP gas torch test of CPC structure: A MAPP gas torch was placed on flat surface in a chemical free exhausted fume hood and ignited and adjusted to a medium flame. Using tweezers a 1.5 g CPC structure was positioned into flame approximately 1 inch from brass tip effectively, blocking/diverting the flame (flame temperature is about 3670° F. (2020° C.)). This position was maintained for 3 minutes and the CPC article removed from the flame. The temperature of the shielded side of CPC structure was measured after a 1 second cool down using a thermocouple. This procedure was repeated with different cooling intervals to provide the additional data points tabulated below. Note, the CPC article convection, or cool down rate, is much faster than the response rate of the thermocouple and required reheating and remeasurement for each data point.

| Time (sec) | Temp (° F.) |
|---|---|
| 1 | 220 |
| 2 | 190 |
| 5 | 121 |
| 10 | 80 |
| 20 | 76 |

Figure 5:
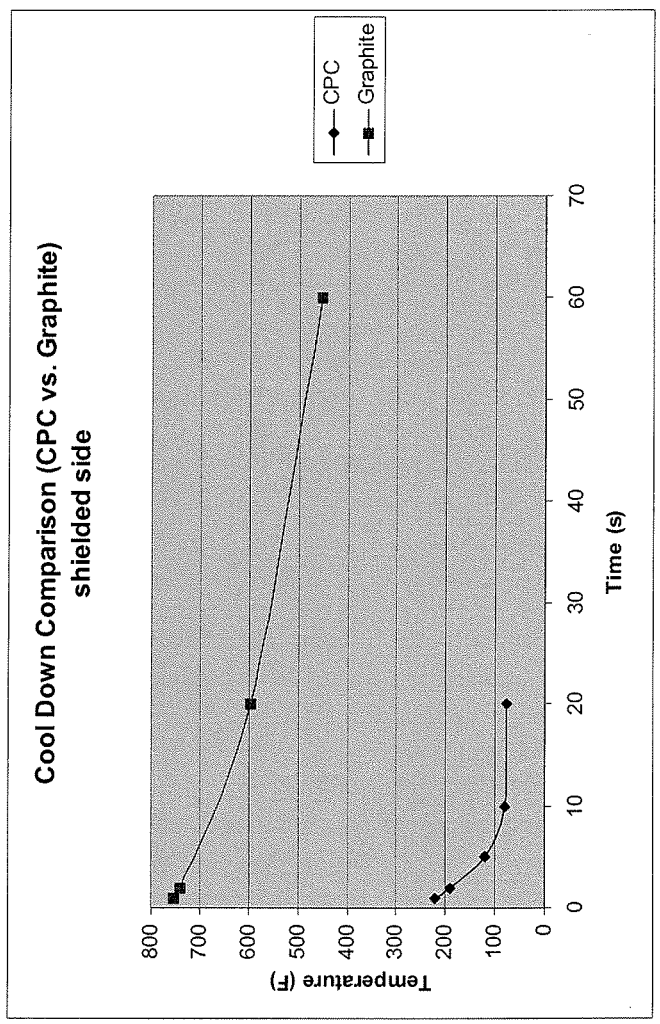
FIG. 5 shows a comparison of the cool down profile of a CPC article of the invention against the cool down profile of graphite.

FIG. 5 shows the results of heat dissipation experiment conducted with a CPC article manufactured in accordance with embodiments of the present invention. As shown in FIG. 5, the thermally conductive high surface area provides the CPC article with quick heat diffusion. A CPC sample prepared in accordance with embodiments of the invention is capable of returning to room temperature after only a 10 second cool down.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A nanoporous network consisting of surfactant-free carbon nanotubes (CNTs) that contact one another to form a three-dimensional array, said nanoporous network having pores defined between the carbon nanotubes that have a pore size range from about 15 nm to about 35 nm with less than about 10% outlier pore sizes outside this range;
   wherein no outlier pore sizes are more than about 100 nm in size.

2. The nanoporous network of claim 1, wherein the nanoporous network has a pore size range from about 20 nm to about 30 nm.

3. The nanoporous network of claim 1, wherein said CNTs have a length in a range from about 0.5 microns to about 5 microns.

4. The nanoporous network of claim 1, wherein said CNTs have a diameter in a range from about 1 nm to about 500 nm.

5. The nanoporous network of claim 1, wherein said CNTs are functionalized.

6. The nanoporous network of claim 1, wherein said CNTs comprise at least one type of carbon nanotube selected from the group consisting of single-walled CNTs, multi-walled CNTs, double-walled CNTs, and combinations thereof.

* * * * *